US012680614B2

(12) United States Patent (10) Patent No.: US 12,680,614 B2
Sander et al. (45) Date of Patent: Jul. 14, 2026

(54) CONTROL VALVE

(71) Applicant: SAMSON Aktiengesellschaft, Frankfurt am Main (DE)

(72) Inventors: Andreas Sander, Ludenbach (DE); Stefan Mohr, Frankfurt am Main (DE); Christoph Voelker, Hanau (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 0 days.

(21) Appl. No.: 18/575,220

(22) PCT Filed: Jun. 28, 2022

(86) PCT No.: PCT/EP2022/067779
§ 371 (c)(1),
(2) Date: Dec. 28, 2023

(87) PCT Pub. No.: WO2023/275080
PCT Pub. Date: Jan. 5, 2023

(65) Prior Publication Data
US 2024/0328519 A1     Oct. 3, 2024

(30) Foreign Application Priority Data

Jun. 28, 2021     (DE) .......................... 202021103439.4

(51) Int. Cl.
F16K 3/24         (2006.01)
F16K 27/00       (2006.01)
(Continued)

(52) U.S. Cl.
CPC .............. F16K 3/246 (2013.01); F16K 27/00 (2013.01); F16K 31/46 (2013.01); F16K 47/08 (2013.01)

(58) Field of Classification Search
CPC .......... F16K 3/246; F16K 47/08; F16K 27/00; F16K 31/46
(Continued)

(56) References Cited

U.S. PATENT DOCUMENTS 4,671,321 A * 6/1987 Paetzel ................... F16K 47/08
137/625.3
9,395,009 B2 7/2016 Lovell
(Continued)

FOREIGN PATENT DOCUMENTS

CN        201818868 U       5/2011
CN        201818891 U       5/2011
(Continued)

OTHER PUBLICATIONS

PCT International Preliminary Report on Patentability and Written Opinion dated Dec. 14, 2023 issued in counterpart PCT Application No. PCT/EP2022/067779 , 7 pages in English.
(Continued)

*Primary Examiner* — John Bastianelli
(74) *Attorney, Agent, or Firm* — Juan Carlos A. Marquez; Marquez IP Law Office, PLLC

(57)         ABSTRACT

A control valve incorporates a valve housing with a main body having a valve inlet and valve outlet, a valve seat in the flow duct between the valve inlet and valve outlet, a valve cage in the flow duct between the valve inlet and valve outlet, and a valve member which is movable in the axial direction (a) relative to the valve seat and valve cage and connectable to an actuator rod of a drive via a drive rod. The valve housing has an extension body extending the main body in the axial direction (a) and a valve cover which closes the extension body and through which the actuator rod can sealably pass. The control valve further includes a circulation barrier in the valve housing which prevents circulation
(Continued)

Figure 1:
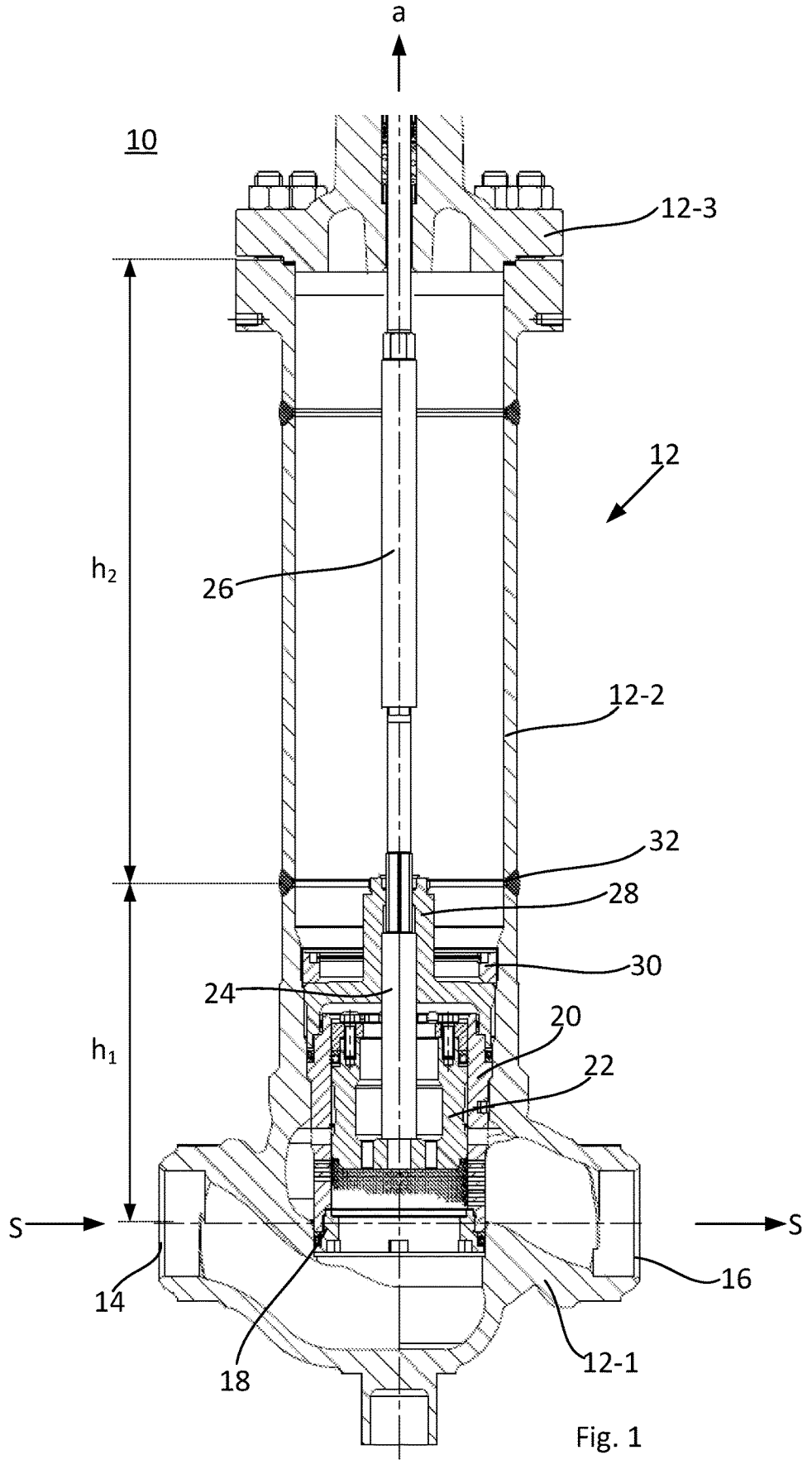

of a process medium in the extension body. The circulation barrier and the valve cage are in contact with each other via contact pressure surfaces opposite one another in the axial direction (a). The circulation barrier and valve cage components are jointly fixed in the valve housing via a fastening means.

14 Claims, 2 Drawing Sheets

(51) Int. Cl.
F16K 31/46          (2006.01)
F16K 47/08          (2006.01)
(58) Field of Classification Search
USPC ........................................................ 251/118
See application file for complete search history.

(56) References Cited

U.S. PATENT DOCUMENTS

| | | | |
|---|---|---|---|
| 9,595,441 | B2 | 3/2017 | Devilliers et al. |
| 10,100,604 | B2 * | 10/2018 | Hopper .................. F16K 25/04 |
| 10,605,370 | B2 | 3/2020 | Hammond et al. |
| 11,143,311 | B2 | 10/2021 | Sander et al. |
| 12,345,344 | B2 | 7/2025 | Wetzstein et al. |
| 2004/0011986 | A1 | 1/2004 | Faramarzi |
| 2009/0218536 | A1 | 9/2009 | Wears et al. |
| 2017/0276252 | A1 * | 9/2017 | McCaskill .............. F16K 47/08 |
| 2017/0314703 | A1 * | 11/2017 | Hoerschken ............ F16K 47/08 |
| 2018/0283580 | A1 | 10/2018 | Sander et al. |
| 2019/0024803 | A1 * | 1/2019 | Sander ................... F16K 47/08 |

FOREIGN PATENT DOCUMENTS

| | | |
|---|---|---|
| CN | 203442149 U | 2/2014 |
| CN | 208634432 U | 3/2019 |
| CN | 210566324 U | 5/2020 |
| DE | 102015005611 A1 | 11/2016 |
| DE | 102015011551 B3 | 3/2017 |
| DE | 102018123544 A1 | 3/2020 |
| DE | 102019104589 A1 | 8/2020 |
| DE | 202021103581 U1 | 7/2021 |
| WO | 2007046379 A1 | 4/2007 |
| WO | 2015057970 A1 | 4/2015 |
| WO | 2016106092 A1 | 6/2016 |
| WO | 2019136200 A1 | 7/2019 |

OTHER PUBLICATIONS

German Search Report dated Apr. 28, 2022 in the counterpart App. No. 20 2021 103 439.4, 3 pages in German.

International Search Report and Written Opinion dated Oct. 14, 2022, in the counterpart App. No. PCT/EP2022/067779, 15 pages in German.

PCT International Search Report mailed Oct. 14, 2022 in counterpart PCT application PCT/EP2022/067779, 3 pages in English.

Europea Patent Office Communication under Rule 71(3) EPC, mailed Mar. 16, 2026, 22 pages in German.

* cited by examiner

CONTROL VALVE

This application is a national stage application filed under 35 U.S.C 371 of International Application No. PCT Application No. PCT/EP2022/067779 filed Jun. 28, 2022, which claims priority to German Patent Application No. 20 2021 103 439.4 filed Jun. 28, 2021. The disclosures of the above-referenced applications are incorporated herein by reference in their entireties.

The invention relates to a control valve of the type specified in the preamble of claim 1.

So-called cage valves, i.e. valves having a valve cage, are well known in the prior art and generally comprise a valve member which is movably supported in the cage valve housing in an axial direction a, and a valve cage that interacts with the valve member. The valve cage has multiple throttle channels that are arranged in such a way that the opening width of the valve cage, i.e. the number of closed or opened throttle channels, and thus the throttle rate, can be set on the basis of the stroke position of the valve member. In addition to the valve cage, cage valves in a known manner also include a valve seat that interacts with the valve member and is designed to complement the valve member, so that in the closed position, i.e. when the valve member is in contact with the valve seat, the valve is closed. Merely by way of example, reference is made to DE 10 2015 005 611 A1.

It is also known that the control valves need to have a special design to regulate or control cryogenic process media: These control valves, hereinafter also referred to as cryogenic valves, are characterized by the fact that the valve housing is designed to have two housing areas, namely a first housing area which has the valve inlet and outlet, the valve cage and the valve seat and which makes contact with the cryogenic process medium, and a second housing area which adjoins the first housing area, acts as an insulating part and carries the housing cover. In purely visual terms, a cryogenic valve thus differs from other control valves by the long insulating part, which creates a spacing between the valve housing through which the cryogenic process medium flows and the upper part of the valve. The insulating part thus extends the distance from an area of extremely low temperatures to the area of the temperature-sensitive sealing arrangement in the area of the housing cover and the drive arranged outside the housing. As a result, damage to the sensitive components of sealing arrangement and drive (for example because of icing of the stuffing box packing, including blocking of the valve) is prevented. It is known furthermore to install what is called a circulation barrier between the two housing areas, which prevents the cold process medium from circulating within the insulating part.

In order to prevent the exchange of energy between the cold valve core and the warm environment, cryogenic valves are often insulated or, in the case of gas liquefaction processes, installed in a cold box. As a result, work on the valve is very laborious and time-consuming, so that low-maintenance and durable designs are required.

DE 10 2019 104 589 A1 discloses a generic control valve having all the features listed in the preamble of claim 1. The control valve housing is designed in one piece, i.e. the housing area with the valve cage and the valve seat merges seamlessly into the second housing area which acts as an insulating part. The control valve disclosed here is characterized in particular by the fact that the valve cage and the valve seat form a structural unit which is held clamped in the valve housing by means of a first threaded sleeve and an associated stop on the housing side. Fastening the circulation barrier arranged in the insulating part is designed accordingly, i.e. the circulation barrier is held clamped between a stop on the housing side and another threaded sleeve.

The disadvantage here is that, during maintenance, for example when the valve seat needs to be replaced due to wear, two threaded sleeves have to be loosened, namely the first threaded sleeve that braces the circulation barrier and the second threaded sleeve that braces the valve cage and valve seat assembly. As a result, maintenance work is relatively time-consuming, complex and therefore expensive.

It is the object of the invention to further develop a control valve of the type specified in the preamble of claim 1 in such a way that maintenance is simplified.

This object is accomplished by the characterizing features of claim 1 in conjunction with the features of its preamble. Dependent claims 2 to 13 relate to advantageous further embodiments of the control valve according to the invention.

The control valve, which is provided in particular for regulating and controlling cryogenic process media and is therefore alternatively also referred to below as a cryogenic valve, in a known manner comprises a valve housing having two housing areas, namely a main body through which the cryogenic process medium is to flow, a valve inlet and valve outlet, in which a valve seat and a valve cage are arranged in the flow duct between the valve inlet and valve outlet, and an extension body which extends the main body in the axial direction a and acts as an insulating part. The control valve, or cryogenic valve, also comprises, in a known manner, a valve member which is movable in the axial direction a with respect to the valve seat and valve cage and which is connectable to a control element rod of a drive via a drive rod, as well as a valve cover which tightly seals the extension body and through which the control element rod of the drive, which is to be connected to the drive rod, can be passed in a sealing manner. In order to prevent the cryogenic process medium from circulating towards the cover in the axial direction a, the control valve furthermore comprises a circulation barrier which is arranged in the valve housing in a known manner.

The present invention now provides for the circulation barrier and the valve cage to have contact pressure surfaces which are designed to correspond to one another and are aligned opposite one another in the axial direction a, via which the circulation barrier and the valve cage are in contact with one another, and that the circulation barrier and valve cage components which are in contact with one another via the opposing contact pressure surfaces are jointly fixed in the valve housing via a single fastening means.

For the sake of completeness only, it is pointed out that 'fastening means' is generally understood to mean any fastening means which is adapted to exert an axial force on the circulation barrier.

The design of the control valve according to the invention proves to be particularly advantageous, as the mounting of the components circulation barrier and valve cage in the valve housing is now realized by means of a single fastening means, so that only a single fastening means has to be loosened during maintenance work, thus enabling simplified maintenance.

In a first embodiment of the control valve according to the invention, the valve cage has a stop surface on the cage side and a corresponding housing shoulder is formed on the main body. The valve cage and the main body of the valve housing are in contact with each other via the stop surface on the cage side and the correspondingly designed housing shoulder, i.e. the valve cage is held axially supported on the housing shoulder via its stop surface on the cage side, so that the circulation barrier and valve cage components can be clamped in place via the fastening means exerting an axial force on the circulation barrier. The advantage of this embodiment is that for maintenance work performed inside the control valve housing it allows simplified access to the components circulation barrier, valve cage and/or valve seat, as only a single fastening means needs to be loosened.

In particular, the valve seat and valve cage components preferably form a structural unit, so that the circulation barrier as well as the valve seat and valve cage unit are held axially clamped in the valve housing by the fastening means. This makes maintenance particularly easy to perform, as the valve seat and the valve cage can now be removed from the control valve housing as a single unit for maintenance purposes after removing the drive and the housing cover and after loosening the fastening means and removing the circulation barrier. This means that it allows the valve seat, which is positioned 'deep within' the valve housing, to also simply be removed without having to loosen additional fastening means.

An alternative second embodiment of the control valve according to the invention provides for the valve seat and the valve cage to form a structural unit and for the valve seat to have a seat-side contact surface and for the main body of the valve housing to have a correspondingly designed main body-side stop. In other words, the valve cage and valve seat assembly is held axially supported on the stop on the main body side via the seat-side contact surface, so that the circulation barrier and the valve cage and valve seat assembly can be clamped via the fastening means exerting an axial force on the circulation barrier. In line with what has been set out above, this in turn enables particularly simplified maintenance, as the assembly unit, i.e. the valve cage and seat, can be removed from the housing as a single unit without the need to loosen other fastening means that are located deep inside the housing and are therefore difficult to reach.

Preferably, the valve cage and valve seat components, which form a structural unit, are connected to each other via a screw connection formed between the valve cage and valve seat. For this purpose, it is preferable for the valve cage to have an internal thread and for the valve seat to have a corresponding external thread, via which the valve cage and valve seat can be screwed together.

In order to be able to carry out axial clamping as simply and quickly as possible by means of the fastening means, another particularly advantageous embodiment of the control valve according to the invention provides for the fastening means to be designed as a threaded sleeve having an external thread, which can be screwed into a correspondingly designed internal thread in the valve housing.

Yet another preferred embodiment of the control valve according to the invention is characterized by the fact that the wall thicknesses of the valve housing parts main body and extension body are designed differently, namely that the main body has a greater wall thickness compared to the extension body.

Preferably, the main body and the extension body are formed in one piece, i.e. the main body merges seamlessly into the extension body, with the wall thickness recess indicating the transition from the main body to the extension body, in other words, as viewed in axial direction a, the recess of the wall thickness defines its end on the extension side with respect to the main body and its beginning on the main body side with respect to the extension body. The advantage of this embodiment is that the valve housing can be produced cost-effectively by casting, as additional machining steps to form flange surfaces are not required.

An alternative embodiment of the invention is characterized by the fact that the main body and the extension body are designed in two parts and, as viewed in the axial direction a, the main body has an extension-side end facing the extension body and the extension body has a main-body-side beginning facing the main body, via which the base and extension bodies are connected to one another in a materially and/or positively and/or non-positively contacting manner. The two-part design of the valve housing advantageously allows greater freedom of design, e.g. the two housing bodies can be made of different materials, or the like.

In order to ensure a sufficient insulating effect of the extension body, the main body and the extension body are preferably dimensioned with respect to their component height $h_1$, $h_2$, as viewed in the axial direction a, such that the following applies:

Height $h_2$ of the extension body$\geq 2 \times$height $h_1$ of the main body,

In which $h_1$ is the height of the main body as viewed in the axial direction a, starting from the valve seat to the end of the main body on the extension side, and $h_2$ is the height of the extension body as viewed in the axial direction a, starting from the beginning on the main body side to the end on the cover side.

In a preferred embodiment, the circulation barrier is arranged in the area of the main body when viewed in the axial direction a. However, it is also conceivable for the circulation barrier to be arranged in the area of the extension body when viewed in the axial direction a.

Throughout the description, the claims and the drawings, those terms and associated reference signs are used as are stated in the list of reference signs below. In the drawings, FIG. 1 is a sectional view of a control valve according to the invention, and FIG. 2 is an enlarged view of the main body of the control valve of FIG. 1.

Figure 2:
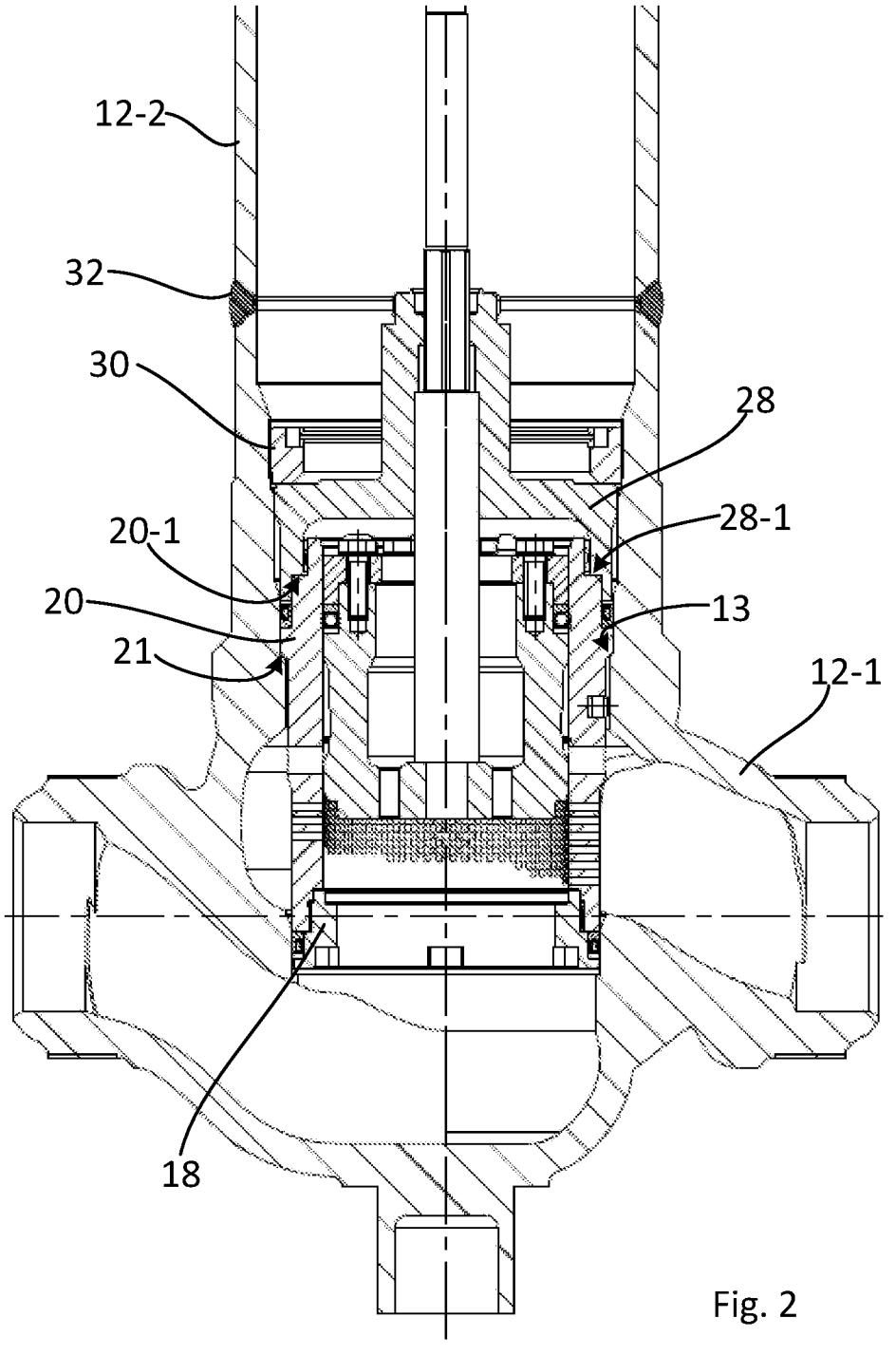

The views of FIG. 1 and FIG. 2 illustrate a control valve 10 for a process plant, in particular for regulating or controlling a cryogenic process medium. These types of control valves 10, which are intended for regulating or controlling cryogenic process media, are also referred to as cryogenic valves. The direction of flow is labeled S in FIG. 1.

The control valve 10 comprises a valve housing designated overall by the reference numeral 12, which in turn comprises a main body 12-1 having the valve inlet and valve outlet 14, 16 and an adjoining extension body 12-2 extending the main body 12-1 in the axial direction a, and a valve cover 12-3 sealing the extension body 12-2 to the surroundings.

In a known manner, the control valve 10 furthermore comprises a valve seat 18 arranged in the flow duct between the valve inlet and valve outlet 14, 16, a valve cage 20 arranged in the flow duct between the valve inlet and valve outlet 14, 16, and a valve member 22 which is movable in the axial direction a with respect to the valve seat 18 and valve cage 20 and which is connectable to a control element rod 26 of a drive (not shown here for reasons of clarity) via a drive rod 24.

While the main body 12-1 essentially serves to accommodate the valve seat 18 and valve cage 20 components fixed to the housing, which are necessary for regulating and controlling the cryogenic process medium, the extension body 12-2, which extends the main body 12-1 in the axial direction a, acts as an insulating part, by means of which an extended distance between the main body 12-1 carrying the cryogenic process medium and the valve cover 12-3 is realized.

In other words, in purely visual terms, a cryogenic valve differs from other known control valves in particular by the long insulating part.

In a known manner, the control valve 10 furthermore comprises a circulation barrier 28, in order to prevent circulation of the cryogenic process medium into the extension body 12-2.

As can be seen in particular in FIG. 2, the valve seat 18 and the valve cage 20 are connected to each other by means of a screw connection, i.e. the valve seat 18 and the valve cage 20 form a structural unit. The assembly consisting of valve seat 18 and valve cage 20 is held axially supported in the valve housing 12 via a cage-side stop surface 21 formed on the valve cage 20 and a correspondingly designed housing shoulder 13 formed in the main body 12-1 of the valve housing 12.

As is furthermore seen in FIG. 2, the circulation barrier 28 and the valve cage 20 are in contact with each other via correspondingly designed contact pressure surfaces 28-1, 20-1 that are opposite each other in the axial direction a, i.e. the circulation barrier 28 and the assembly consisting of the valve cage 20 and the valve seat 18 are held axially supported on the housing shoulder 13.

The components circulation barrier 28 and the assembly consisting of valve cage 20 and valve seat 18 are fastened using a single fastening means 30 that axially clamps the components circulation barrier 28, valve cage 20 and valve seat 18 in place against the housing shoulder 13. The fastening means 30 is designed as a threaded sleeve with an external thread, which can be screwed into a corresponding internal thread in the valve housing 12.

This design, namely the fastening of the components circulation barrier 28 and the structural unit consisting of valve cage 20 and valve seat 18 via a single fastening means 30—here in the form of a threaded sleeve—proves to be particularly advantageous, as only one fastening means needs to be loosened for maintenance purposes.

As is furthermore seen in FIGS. 1 and 2, the main body 12-1 and the extension body 12-2 are formed in two parts, which are bonded together by welding. The transition between the main body 12-1 and the extension body 12-2 is thus defined in the present case by the weld seam 32, since this is where the extension-side end of the main body 12-1 facing the extension body 12-2 is connected to the base-body-side beginning of the extension body 12-2 facing the main body 12-1.

The component heights of the components main body 12-1 and extension body 12-2, as viewed in the axial direction a, are labeled $h_1$ and $h_2$ in FIG. 1. As seen in FIG. 1, $h_1$ is the component height of the main body 12-1 extending from the valve seat 18 to the weld seam 32, and $h_2$ is the component height of the extension body 12-2 extending to the valve cover 12-3. As is also seen in FIG. 1, the circulation barrier 28 is arranged in the area of the main body 12-1 when viewed in axial direction a.

LIST OF REFERENCE SIGNS 10 control valve
12 valve housing

6

12-1 main body
12-2 extension body
12-3 valve cover
13 housing shoulder
14 valve inlet
16 valve outlet
18 valve seat
20 valve cage
20-1 contact pressure surface
21 cage-side stop surface
22 valve member
24 drive rod
26 control element rod
28 circulation barrier
28-1 contact pressure surface
30 fastening means
32 weld seam
a axial direction
S flow direction
$h_1$ component height main body
$h_2$ component height extension body

The invention claimed is:

1. A control valve for regulating or controlling a cryogenic process medium, comprising a valve housing with a main body having a valve inlet and valve outlet, a valve seat arranged in the flow duct between the valve inlet and valve outlet, a valve cage arranged in the flow duct between the valve inlet and valve outlet, and a valve member which is movable in an axial direction with respect to the valve seat and valve cage and which is connectable to a control element rod of a drive via a drive rod, wherein the valve housing has an extension body extending the main body in the axial direction and a valve cover which closes the extension body, the control element rod of the drive to which the valve member is connected to the drive rod being configured to sealingly pass through the valve cover, wherein the control valve furthermore comprises a circulation barrier arranged in the valve housing and configured to prevent circulation of said cryogenic process medium in the extension body, wherein the circulation barrier and the valve cage are in contact with each other via contact pressure surfaces which are formed so as to correspond to one another and are situated opposite one another in the axial direction, and in that the circulation barrier and valve cage that are in contact with one another via the opposing contact pressure surfaces, are jointly fixed in the valve housing via a fastener, and wherein the components valve cage and valve seat, which form a structural unit, are connected to one another via a screw connection formed between the valve cage and the valve seat.

2. A control valve according to claim 1, wherein the valve cage has a cage-side stop surface and the main body of the valve housing has a housing shoulder formed to correspond thereto, via which the valve cage and the main body of the valve housing are in contact with one another, and in that the components circulation barrier and valve cage are held clamped between the fastener and the housing shoulder on the main body side.

3. A control valve according to claim 2, wherein the components valve seat and valve cage form a structural unit, and in that the circulation barrier and the structural unit comprising valve seat and valve cage are held clamped between the fastener and the housing shoulder.

4. A control valve according to claim 1, wherein the valve seat and the valve cage form a structural unit, and in that the valve seat has a seat-side contact surface and the main body of the valve housing has a main-body-side stop designed to correspond thereto, via which the structural unit comprising the valve cage and the valve seat, as well as the main body of the valve housing are in contact with one another, and in that the components circulation barrier and the structural unit comprising the valve cage and the valve seat are held clamped between the fastener and the main body-side stop.

5. A control valve according to claim 1, wherein the valve cage has an internal thread, and the valve seat has a corresponding external thread.

6. A control valve according to claim 1, wherein the valve housing has an internal thread in the region of the circulation barrier, and in that the fastener is designed as a threaded sleeve having an external thread corresponding to the internal thread.

7. A control valve according to claim 1, wherein the main body has a greater wall thickness compared to the extension body.

8. A control valve according to claim 7, wherein the main body and the extension body are formed in one piece, wherein, as viewed in the axial direction, the recess of the wall thickness with respect to the main body defines an extension-side end thereof and with respect to the extension body, the recess defines a base-body-side beginning thereof.

9. A control valve according to claim 1, wherein the main body and the extension body are designed in two parts, and as viewed in the axial direction, the main body has an extension-side end facing the extension body and the extension body has a base-body-side beginning facing the main body, via which the base and extension bodies are connected to one another in a materially and/or positively and/or non-positively contacting manner.

10. A control valve according to claim 8, wherein viewed in the axial direction, the main body of the valve housing has a height ($h_1$) starting from the valve seat to the extension-side end, and the extension body has a height ($h_2$) starting from the base-body-side beginning to the cover-side end, with the main body and the extension body being dimensioned with respect to their component heights such that the following applies:

Height ($h_2$) of the extension body (12-2)$\geq$2$\times$height ($h_1$) of the main body.

11. A control valve according to claim 1, wherein as viewed in the axial direction, the circulation barrier is arranged in the region of the main body.

12. A control valve according to claim 1, wherein as viewed in the axial direction, the circulation barrier is arranged in the region of the extension body.

13. A control valve according to claim 9, wherein viewed in the axial direction, the main body of the valve housing has a height ($h_1$) starting from the valve seat to the extension-side end, and the extension body has a height ($h_2$) starting from the base-body-side beginning to the cover-side end, with the main body and the extension body being dimensioned with respect to their component heights such that the following applies:

Height ($h_2$) of the extension body (12-2)$\geq$2$\times$height ($h_1$) of the main body.

14. A control valve according to claim 1, wherein the circulation barrier is configured to be bell-shaped so as to guide the control element rod.

\* \* \* \* \*